June 15, 1971 J. C. MEYER ET AL 3,584,398

TEACHING DEVICE HAVING MEANS PRODUCING A SELF-GENERATED PROGRAM

Filed Sept. 29, 1969 3 Sheets-Sheet 1

INVENTORS
JEROME C. MEYER
JAMES A. TILLOTSON, III
BY
Harvey J. [signature]
ATTORNEY INVENTORS
JEROME C. MEYER
JAMES A. TILLOTSON, III
BY Harvey [signature]
ATTORNEY

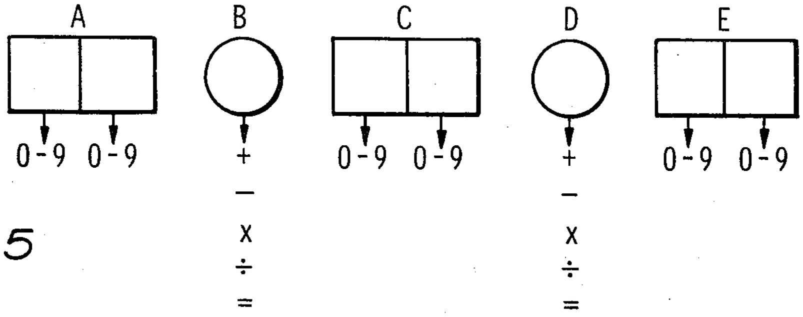

Fig_5

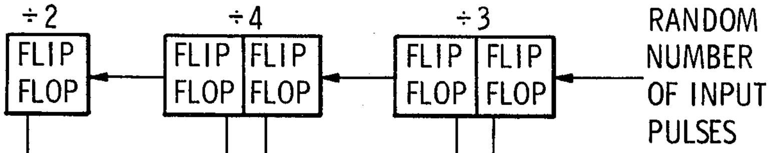

Fig_6A

| NO. OF INPUT PULSES | = | ↓ | OTHER OPERATOR | ↓ | ↓ | UNKNOWN POSITION | ↓ | ↓ | ACTUAL MACHINE ARITH. | ACTUAL PROCESS PERFORMED |
|---|---|---|---|---|---|---|---|---|---|---|
| 0 | B | 0 | + | 0 | 0 | A | 0 | 0 | + | C + E |
| 1 | B | 0 | + | 0 | 0 | C | 0 | 1 | + | C + E |
| 2 | B | 0 | + | 0 | 0 | E | 1 | 0 | + | C + E |
| 3 | B | 0 | − | 0 | 1 | A | 0 | 0 | + | A + E |
| 4 | B | 0 | − | 0 | 1 | C | 0 | 1 | + | A + E |
| 5 | B | 0 | − | 0 | 1 | E | 1 | 0 | + | A + E |
| 6 | B | 0 | x | 1 | 0 | A | 0 | 0 | x | C x E |
| 7 | B | 0 | x | 1 | 0 | C | 0 | 1 | x | C x E |
| 8 | B | 0 | x | 1 | 0 | E | 1 | 0 | x | C x E |
| 9 | B | 0 | ÷ | 1 | 1 | A | 0 | 0 | x | A x E |
| 10 | B | 0 | ÷ | 1 | 1 | C | 0 | 1 | x | A x E |
| 11 | B | 0 | ÷ | 1 | 1 | E | 1 | 0 | x | A x E |
| 12 | D | 1 | + | 0 | 0 | A | 0 | 0 | + | A + C |
| 13 | D | 1 | + | 0 | 0 | C | 0 | 1 | + | A + C |
| 14 | D | 1 | + | 0 | 0 | E | 1 | 0 | + | A + C |
| 15 | D | 1 | − | 0 | 1 | A | 0 | 0 | + | C + E |
| 16 | D | 1 | − | 0 | 1 | C | 0 | 1 | + | C + E |
| 17 | D | 1 | − | 0 | 1 | E | 1 | 0 | + | C + E |
| 18 | D | 1 | x | 1 | 0 | A | 0 | 0 | x | A x C |
| 19 | D | 1 | x | 1 | 0 | C | 0 | 1 | x | A x C |
| 20 | D | 1 | x | 1 | 0 | E | 1 | 0 | x | A x C |
| 21 | D | 1 | ÷ | 1 | 1 | A | 0 | 0 | x | C x E |
| 22 | D | 1 | ÷ | 1 | 1 | C | 0 | 1 | x | C x E |
| 23 | D | 1 | ÷ | 1 | 1 | E | 1 | 0 | x | C x E |

Fig. 6B

INVENTORS
JEROME C. MEYER
BY JAMES A. TILLOTSON, III
Harvey J. Faustman
ATTORNEY United States Patent Office 3,584,398
Patented June 15, 1971

3,584,398

TEACHING DEVICE HAVING MEANS PRODUCING A SELF-GENERATED PROGRAM

Jerome C. Meyer, Los Altos, and James A. Tillotson III, Sunnyvale, Calif., assignors to Hu-Mac, Inc., Mountain View, Calif.

Filed Sept. 29, 1969, Ser. No. 861,604
Int. Cl. G09b 7/02
U.S. Cl. 35—31 17 Claims

ABSTRACT OF THE DISCLOSURE

A novel teaching machine having an indicia display means, random signal generator means for actuating said display means, a keyboard and a means for electronically determining a functional interrelationship between the displayed indicia and comparing it with an input keyed into the keyboard by a student viewing the display in order to develop the student's skill in evaluating the relationship between the displayed indicia as well as utilizing the keyboard.

BACKGROUND OF THE INVENTION

The present invention relates generally to teaching machines and, more particularly, to a novel machine for simultaneously teaching indicia relationships and keyboard operation without requiring the use of a previously prepared program.

Means have long been provided for training an operator to use the keyboards of various types of equipment by requiring that he visually inspect a sequence of indicia and depress the corresponding keys on the machine keyboard. Examples of such devices are disclosed in the U.S. Pats. to Goodell et al. 3,021,611, Priednicks et al. 3,100,351, Steury 3,136,073, Kobler et al. 3,281,959, and Hannah et al. 3,355,819. Although each of these prior art devices are primarily concerned with training an individual to utilize a keyboard and incidentally improve the users mental prowess, each requires that some type of previously prepared program be provided for generating the display which is to be observed by the student so that he may responsively actuate the keyboard. These devices also include means for comparing the displayed program with the keyboard manipulations performed by the student in order that his learning progress may be evaluated.

In addition to increasing the cost and complexity of the teaching apparatus, the necessity of providing a programmed tape or film as well as a means for displaying the program makes for a generally bulky device typically requiring a substantial number of mechanical components which give rise to troublesome as well as expensive periodic maintenance. Were it possible to provide a comparable teaching device which did not require the previously prepared program, but instead generated the display indicia using random signal generating techniques, a considerably less complicated, less expensive and more efficient device would be realized, and more readily utilizable.

OBJECTS OF THE PRESENT INVENTION

It is therefore an object of the present invention to provide a novel character relationship and keyboard training device which requires no previously prepared program as an operative element thereof.

Another object of the present invention is to provide a novel arithmetic training device which utilizes random number signal generators to provide display indicia which are to be analyzed by the student who then inserts his answer into a keyboard for electronic comparison.

Still another object of the present invention is to provide a novel keyboard training machine which is entirely electronic in operation and requires no previously prepared program to provide the visual indicia.

Still another object of the present invention is to provide a novel electronic tool for training an individual to rapidly analyze a plurality of parameters having a certain interrelationship and perform a specific function in response thereto.

Another object of the present invention is to generate, by any means, random indicia, which, by predetermined or randomly generated relationship or relative standard, require from a student, a response which may be compared to a desired response to teach or train the student. The student response may be manifested by the use of any suitable means including keypunch devices, push buttons, knobs, dials, and voice.

SUMMARY OF THE PRESENT INVENTION

In accordance with the present invention, a novel teaching machine is provided which in a preferred form includes a display means for displaying a plurality of indicia, a keyboard having a plurality of keys arranged in some predetermined order and a means for comparing the displayed indicia or some functional interrelationship therebetween with the output of the keyboard in order to develop a student's skill in utilizing the keyboard as well as mentally evaluating the relationship between the displayed indicia. The display indicia, which may be visual, tactile, audio or olfactory in nature, are independently altered in response to random signal generator means which cause them to change in a random order rather than in some programmed sequence. In one embodiment, the device also included a timer for determining some selected testing period and a counting device for determining the number of correct keyboard manipulations accomplished within the timed period.

An important advantage of the apparatus of the present invention is that since the display is generated randomly it does not require that any predetermined display program be prepared therefor.

Another advantage of the present invention is that one can utilize the device over and over to improve his analytical ability as well as keyboard dexterity without being subjected to an identical display sequence since each character of the display is generated randomly and independently.

Another advantage of the present invention is that in a suitable embodiment the display may be generated by electronic random signal generating means so that no mechanical program conversion components are required.

Still another advantage of the present invention is that one device can be utilized to selectively provide various types of display so as to require that different types of mental activity be exercised in response thereto.

Still other advantages of the present invention will become apparent to those skilled in the art after having read the following detailed description of the preferred embodiments which are illustrated in detail in the several figures of the drawing.

IN THE DRAWING

FIG. 5 is a diagram illustrating a possible form which the displayed indicia might take in accordance with the present invention.

FIG. 6A illustrates a modulo 24 counter which may be incorporated in an embodiment of the present invention.

FIG. 6B is an operations table illustrating operation of an embodiment of the present invention.

DETAILED DESCRIPTION OF THE PREFERRED EMBODIMENTS

Figure 1:
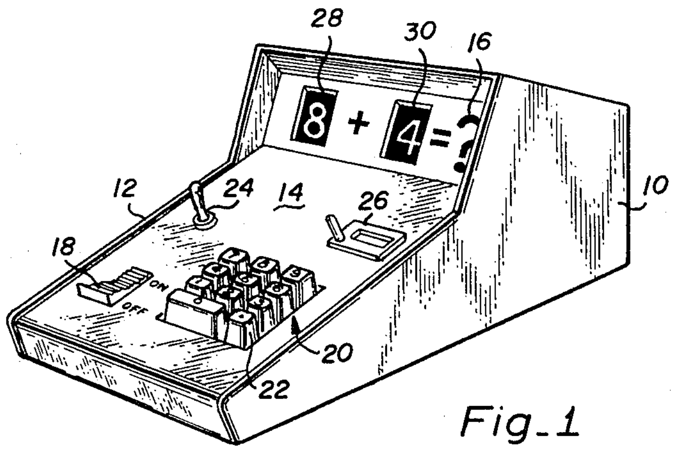
FIG. 1 is a pictorial illustration of a basic arithmetic instruction device in accordance with the present invention.

In FIG. 1 of the drawing, there is shown a preferred embodiment of an arithmetical instruction device in accordance with the present invention which includes a housing 10 that is suitably configured to contain the electronics necessary to operate the device while at the same time providing an attractive as well as functional keyboard mount and display panel. The inclined panel 12 forms the upper portion of the housing 10 and includes an inclined portion 14 which accommodates the manipulative controls of the device and a more sharply inclined portion 16 which forms the display panel 16. Arranged on the panel 14 are an on-off switch 18, a keyboard 20, a three position switch 24 and an electromagnetic impulse counter 26. The keyboard 20 includes ten buttons for accommodating the digits 0, 1, 2 . . . 9 and an eleventh button 22 for causing the number selected on the keyboard to be entered into the comparator apparatus of the device.

The display panel 16 includes a pair of windows 28 and 30 behind which are placed suitable indicia display means, such as Nixie tubes, or the like. Affixed to the face of the panel 16 between the two windows 28 and 30 is a plus sign, and an equal sign is displayed to the right of the window 30 followed by a question mark to nidicate that the student is to add the numbers indicated in the windows 28 and 30. After the student mentally computes the answer and depresses the appropriate keys on the keyboard 20, the comparator button 22 is depressed. If the keyed in figure was equal to the right answer, a new set of numbers will immediately be displayed at 28 and 30 and the counter 26 will be advanced one count. Although not included in the preferred embodiment, it may also be desirable to provide a suitable audible signalling device to indicate a correct answer.

In using the device, the on-off switch 18 is depressed to the on position and the student decides whether he wishes to work the device continuously or attempt to work against a selected time period. After deciding he appropriately actuates the three position switch 24 which has a start position, a timed operation position and a continuous operation position. If he selects the continuous mode, the device will operate continuously for an indefinite period of time, whereas if he selects the timed mode the operation will be terminated after a preselected period which may, for example, be one minute. Assuming the timed mode of operation is chosen, the student first sets the counter to zero, deflects the switch 24 into the start position and then into the timed operation position and immediately two digits appears in the windows 28 and 30. The student then adds the two digits, punches out the answer on the keyboard 20 and depresses the button 22 which, if the answer is correct, causes a tally to be added to the counter and a new set of digits to be immediately displayed. The operation is repeated as rapidly as possible during the timed period.

Each time a correct entry is made into the keyboard, a correct count is produced on the counter 26 which totals up the number of correct operations made during the one minute time period. If an incorrect answer should be entered onto the keyboard 20 followed by a depression of the button 22, the keyboard will be cleared but the indicia in windows 28 and 30 will not change and the student will known that his answer was wrong. He must then enter the right answer onto the keyboard before he can continue.

Although the particular device illustrated is designed to teach arithmetic addition as well as to improve keyboard competence, it is to be understood that an appropriately modified device could just as well be provided to teach subtraction, multiplication, or division. Furthermore, where the principal use of the device is to train the student in keyboard operation the particular design of the keyboard may be modified to conform to the keyboard of some other type of device, such as for example, the staggered button keyboard of the standard keypunch machines used by computer programmers.

Figure 2:
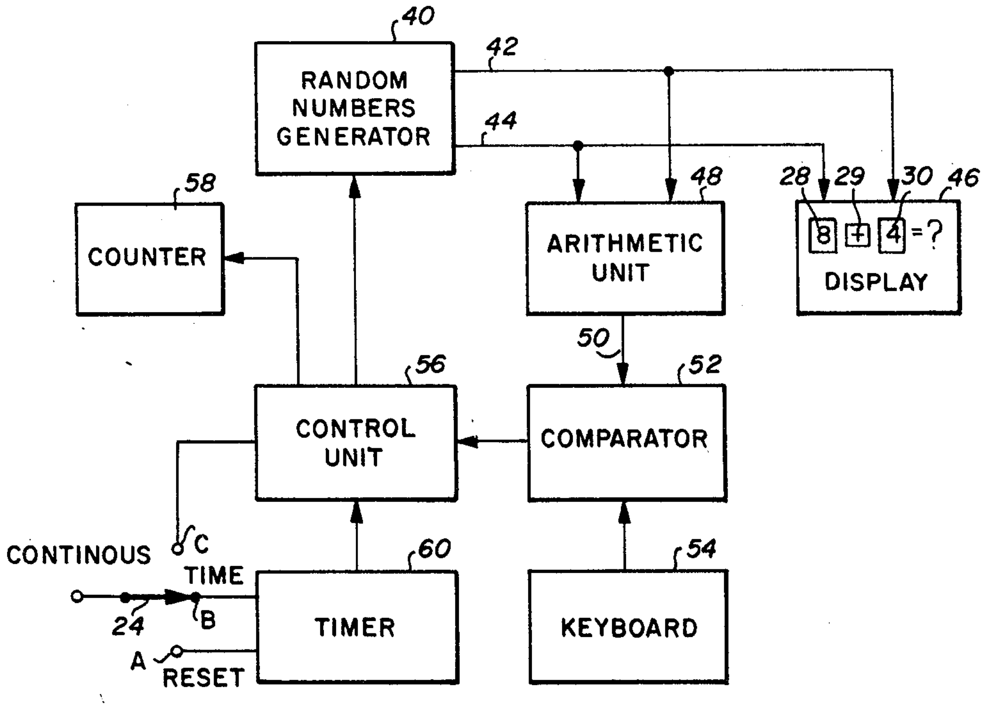
FIG. 2 is a block diagram illustrating the components of the basic arithmetic instruction device illustrated in FIG. 1.

Turning now to FIG. 2 of the drawing, a block diagram of the internal components of the device is illustrated which includes a random numbers generator 40 having two output lines 42 and 44 upon which independent signals corresponding to the digits 0 through 9 are randomly output. The output line 42 is coupled to a display means, the face of which is exposed through window 30 of the display device 46, and the random output line 44 is coupled to the display device which is positioned behind the window 28. The output lines 42 and 44 are also coupled to the inputs of an arithmetic unit 48 which combines the random output signals in accordance with the function indicated by the arithmetical operator 29, shown on the face of the display device 46, to produce an output on line 50 which is fed into one input of the comparator 52. Also input to the comparator 52 is an electrical signal responsive to the number entered into the keyboard 54.

Upon having like signals input thereinto, the comparator 52 generates an output signal which is coupled into a control unit 56 that in turn causes a new set of random numbers to be generated by the generator 40. The output of the control unit 56 also causes the counter 58 to be advanced one digit each time a new set of random numbers is generated. In order to select the mode of operation of the device, a position mode switch 24 is provided which, in position A, a momentary position causes the timer to be reset, in position B, causes the timer to run for a predetermined period of time before supplying a signal to the control unit to disable the random generator 40, and a position C, which allows the device to be operated continuously.

As an example of the operation of the device, assume that the student wishes to improve his speed in the addition of two numerical digits. After turning the device on, he will switch the mode switch 24 to position A to reset the timer. This, being a spring loaded momentary position, will immediately switch to B upon release at which time a start signal will be sent to control unit 56 to activate the random numbers generator 40. The generator 40 will then generate random electrical output signals on lines 42 and 44 which will be converted into the digital characters to be displayed through windows 28 and 30. The student will then, as quickly as possible, add the numbers 8 and 4 and enter the answer 12 into the keyboard 54 and depress the enter button to enter the number into the comparator 52. Meanwhile, the arithmetic unit 48 will have performed the required addition of the two signals appearing on lines 42 and 44 and will produce an input to the comparator 52 equivalent to the correct answer.

The comparator 52 will then compare the inputs from the unit 48 and the keyboard 54 and if the correct answer has been entered into the keyboard, the comparator 52 will signal the control unit 56 that a proper comparison has been made and the control unit will immediately reactuate the generator 40 causing it to produce a new numerical display. The output from the control unit 56 also advances the counter 58 by one digit to indicate that one correct answer has been made. The student then repeats the operation as rapidly as possible and as many times as he can before the time period elapses and the timer causes the device to be inactivated. At the expiration of the period, the student may note the total number of correct answers obtained on counter 58 and compare this with a previous performance to evaluate his learning process.

This device has been found to be highly effective from an educational standpoint since it provides a stimulus, allows the student to respond, and then gives immediate reinforcement after a correct response has been made. The fact that the machine operates instantaneously to change the display to an unpredictable new stimulus, captures and retains the attention of the student and allows him to proceed at his fastest possible rate since he need not wait for a new display following the insertion of a correct answer. Thus, the only time limiting factors involved in the operation of the device are those attributable to the mental and physical abilities of the student.

Figure 3:
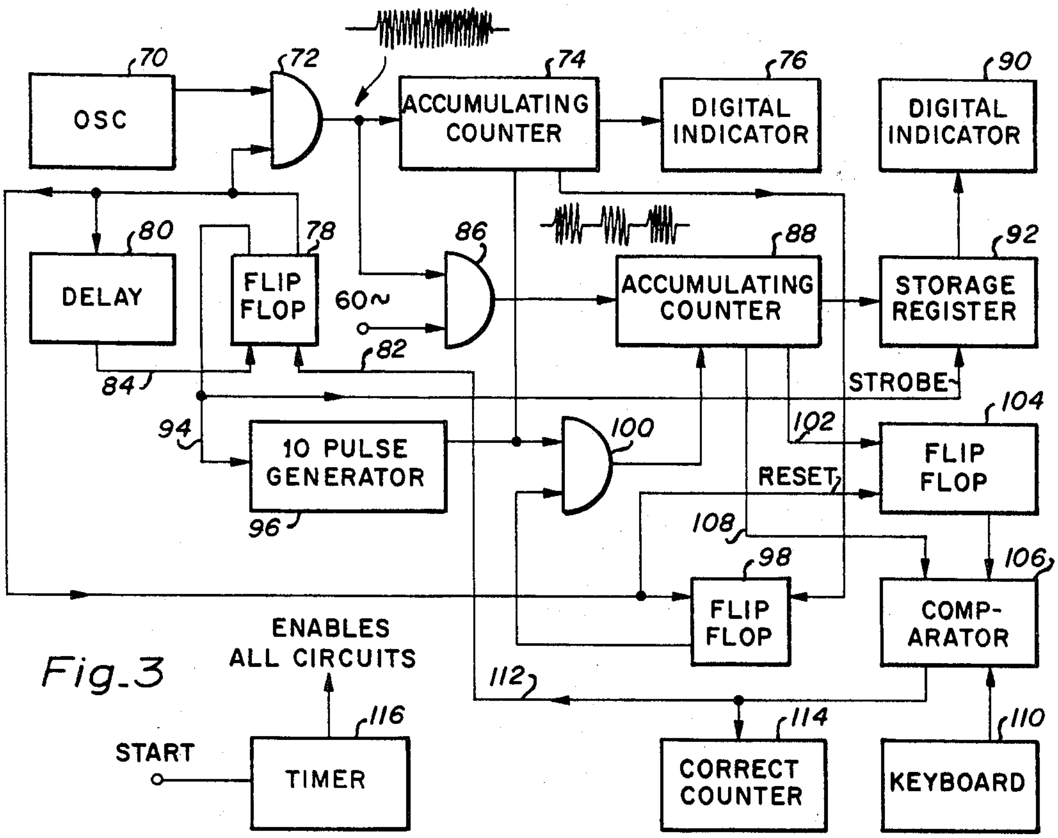
FIG. 3 is a more detailed block diagram of the apparatus shown in simplified form in FIG. 2.

Although the actual circuit elements which can be utilized to form the system illustrated in the block diagram of FIG. 2 can take many forms, a specific example of an operable embodiment is illustrated in FIG. 3 of the drawing. The system includes a high frequency oscillator 70 which is coupled through an AND gate 72 to an accumulating counter 74 that is utilized to drive a digital indicator 76, which may be a nixie tube, or the like. The oscillator 70 has a fixed frequency of, for example, one megahertz, which during the time that the gate 72 is open causes the accumulating counter 74 to repetitiously count from 0 through 9 until the gate is closed. Upon the closing of the gate 72, the last count is held and displayed on the indicator 76. By opening the gate 72 to allow the high frequency signal to spill into the counter and then closing it some indefinite number of cycles later, the indicia displayed on the indicator 76 is caused to be nearly random and has no actual relationship to the control input to the gate 72.

The control input to the gate 72 is provided by a flip-flop 78 the output of which is fed through a delay 80 and then back into the reset side of the flip-flop 78 so that the period that the gate 72 is open is equivalent to the period of the delay means 80. The delay period of the means 80 might, for example, be approximately 250 milliseconds so that in the case where the count rate of the counter 74 is $1\times10^6$ counts per second, i.e., the frequency of the oscillator 70 is 1 megahertz, the number of counts which would be introduced into counters 74 would be $2.5\times10^5$. If the delay means 80 has a period accuracy of 0.1% then the count ambiguity will be 250 counts. Even if the delay means had a period accuracy of 0.1% the count ambiguity will still be as high as 25 counts. This means that there will be an uncertainty of at least 25 counts, which being in excess of 10 means that the final units digit are unpredictable and, therefore, random.

In order to generate the second random number, the output of the gate 72 is fed through a second gate 86 and into a second accumulating counter 88. The output of the counter 88 is fed to the second digital indicator 90 via a storage register 92. In order that the second indicator be made random with respect to the first indicator, the gate 86 is energized with a 60 cycle dither so that the wave form input to the counter 88 is as illustrated. Due to the low tolerances of the circuit apparatus, there is thus no consistent correlation between the outputs indicated on the displays 76 and 90 and they may be said to have no interrelationship.

As the flip-flop 78 is reset, the output is fed through line 94 to a 10 pulse generator 96 which generates 10 pulses that are fed into the accumulating counter 74. These 10 pulses cause the counter to count through one complete cycle back around to where it was before the 10 pulses. Because of the speed at which this occurs, there is no noticeable occurrence of this additional count on the indicator 76. As the counter 74 counts past zero, a carry signal is generated and introduced into the set input of a flip-flop 98. The output of the 10 pulse generator 96 is also fed into the accumulating counter 88 through a gate 100 which is driven by the flip-flop 98.

Since the flip-flop 98 is set by the carry from counter 74, and this carry will be generated when a number of pulses equalling the 10's complement of the number stored in counter 74 is received, then gate 100 will be opened after the complement of the number stored in counter 74 has been clocked out of the 10 pulse generator. For example, if 8 has been stored in counter 74, then flip-flop 98 will be set following the first 2 pulses from the 10 pulse generator. Gate 100 will then allowing the remaining 8 pulses of the 10 pulses to be accumulated into counter 88. In this manner the addition is performed.

Notice that prior to the execution of the 10 pulses, counter 74 contained the number 8 and counter 88 contained the number 4. After the execution of the 10 pulses, counter 74 still contains the number 8 (since it has been cycled one full cycle of 10) and counter 88 contains the 2 which is the least significant digit of the answer which is 12. The most significant digit of the answer is stored in flip-flop 104 and was generated when counter 88 carried during the addition cycle. This example demonstrates the purpose of storage register 92.

Since accumulating counter 88, unlike accumulating counter 74 does not contain the same number after addition, then the number stored prior to addition is stored in register 92 upon completion of the random number accumulation and prior to the performance of the arithmetical operation. This is accomplished by using the delay flip-flop 78 to allow the storage register 92 to "follow" the accumulating counter 88 until the delay is complete, at which time the storage register 92 is no longer allowed to "follow" the counter 88, thus holding for display the original addend while counter 88 is further used to accumulate the sum.

Input to the other side of the comparator 106 is the output of the keyboard 110. If the two inputs to the comparator are equal, the comparator generates an output signal on the line 112 which is returned to the flip-flop 78 causing the gate 72 to again be open to cause a new set of random numbers to be displayed on the indicators 76 and 90. The output of the comparator 106 is also used to energize a counter 114 which indicates the number of correct manipulations performed by the student during the period of use of the device. A timer 116 is also provided for enabling all of the circuits upon having a start input applied thereto.

Figure 4:
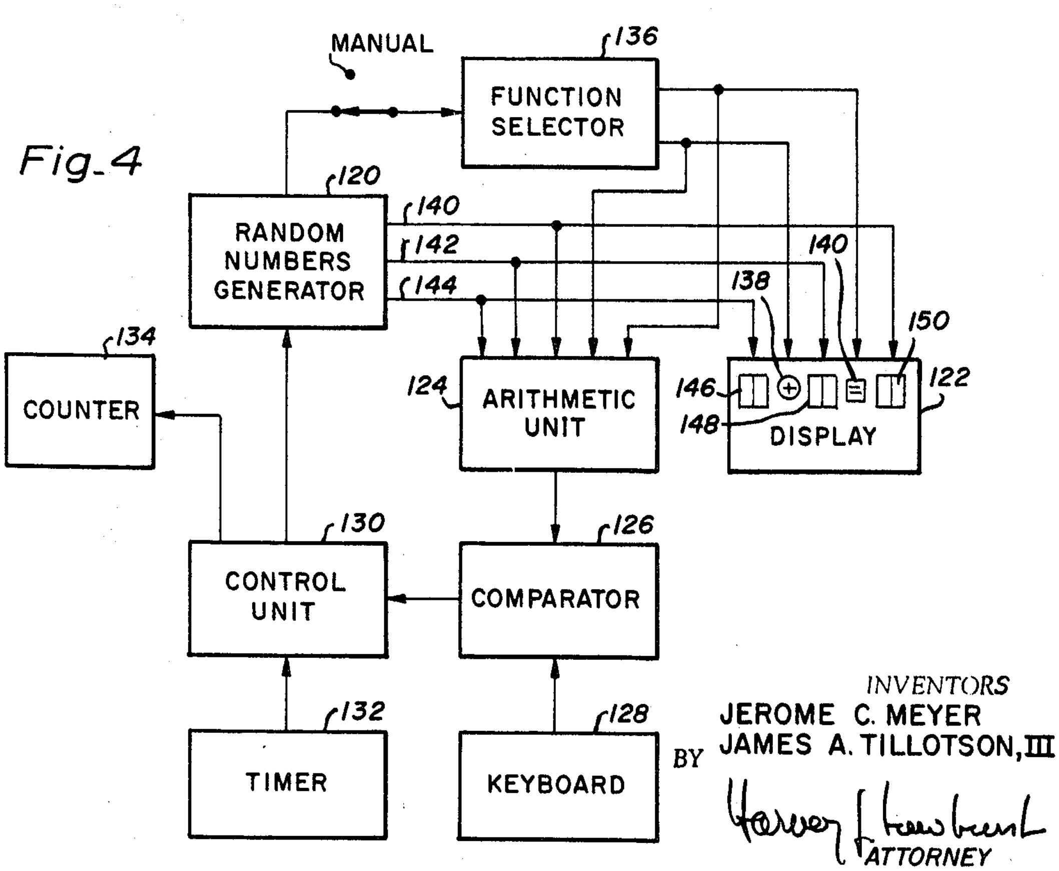
FIG. 4 is a block diagram illustrating a more versatile teaching device in accordance with the present invention.

Turning now to FIG. 4 of the drawing, a block diagram of a more versatile device will be described. As in the system schematically illustrated in FIG. 2, this system includes a random numbers generator 120, a display means 122, an arithmetic unit 124, a comparator 126, a keyboard 128, a control unit 130, a timer 132 and a counter 134. However, whereas the system illustrated in FIG. 2 was limited to performing a single operation, namely, the addition of two randomly generated numbers, the present embodiment is made capable of not only forming an arithmetic combination of more than two numbers, but can also provide a random selection of the arithmetic operators.

The operator selection is provided by a signal generating means 136 having two outputs coupled to the operator display means disposed behind windows 138 and 140. As an example, the operators displayed in the windows 138 and 140 may take the form of plus signs, minus signs, multiplication signs, division signs, equal signs or combinations thereof. The function selector 136 may be manually operated or it may be comprised of a second random generating mechanism similar to the random numbers generator 120 so that not only the numbers but also the operators may be random.

In this embodiment, the random numbers generator 120 has three random number output lines 140, 142 and 144 which are respectively coupled to the digital display means behind the windows 146, 148 and 150. However, only two of them are provided with outputs at any one time. The two random outputs along with the two outputs of the functions selector 136 are fed into the arithmetic unit 124 so as to enable the unit 124 to make the proper calculation and input an answer signal into the comparator 126 for comparison with the answer entered into the keyboard 128 by the student.

The problem would be set up displaying in the display windows A through E as illustrated in FIG. 5, indicia of the form shown below each window. This could be accomplished by using the random number generator to generate a random number of modulo 24. The modulo 24 counter might, for example, be comprised of 2 flip-flops connected as a mod 3 (÷3) counter following by 3 flip-flops connected as a straight 3 bit binary counter (÷4, ÷2) as illustrated in FIG. 6A. This random number would determine which operator was the equal sign and what the other operator was as well as which of the displays was to be the unknown. After this is performed as indicated in the table shown in FIG. 6B and the appropriate numbers are presented in the respective display windows and are fed to the arithmetic unit 124.

Although the operation of this embodiment is generally similar to that of the previously described embodiment, it will be understood that a considerably more complicated arithmetic exercise can be accommodated. Using a device in accordance with this embodiment, the student can in a single problem be subjected to combined arithmetic operations.

Whereas the present invention has been described with particular reference to a device for performing arithmetic functions using numbers to the base 10, it is also possible that the device could be used with other numbering systems. Furthermore, the displayed indicia need not be numerical figures but may take the form of any set of representative characters, either visual, audio, tactile or olfactory in nature, which have some interrelationship which will require a predetermined mental treatment by the student in order to determine an answer which can be keyed into the comparator. Moreover, the indicia may be of the type which requires simple matching of characters.

Although single purpose devices in accordance with the invention can be readily provided, the contemplated ramifications of utility of a more sophisticated embodiment of this device are manyfold since once the electronics of the sophisticated embodiment are determined, it will be possible to change from one type of teaching to another by merely substituting the appropriate display indicators and keyboard characters and selecting the proper computing characteristic for the signal analyzing portion of the device.

Wherein the related prior art devices have necessarily required that some type of mechanical drive means be provided for displaying a previously prepared program to the student, the present invention makes no such requirement and thus can be made free of internal mechanical components if found desirable for a particular application. Furthermore, by using any of the forms of non-mechanical switching devices well-known in the art for the keyboard and other switches, a completely non-mechanical device can be provided. For example, the keyboard could be comprised of a plurality of heat sensitive, proximity or capacitance-type switches such as are used in elevator call systems, and the like.

While the invention has been described with reference to specific preferred embodiments, it is contemplated that many alterations and modifications will become apparent to those skilled in the art after having read the foregoing description. It is therefore to be understood that this description is for purposes of illustration only and is in no manner intended to be limiting in any way. Furthermore, it is intended that the appended claims be interpreted as covering all modifications which fall within the true spirit and scope of the invention.

What is claimed is:

1. A teaching device comprising:
a random signal generator means for generating at least two random output signals in response to a control signal;
display means responsive to said output signals and operative to provide a display of indicia commensurate with said output signals, said display means further displaying indicia commensurate with a particular relationship concerning the output signal indicia;
signal computer means responsive to said output signals and operative to provide a computed signal in accordance with said particular relationship;
response insertion means into which a proposed solution to said particular relationship can be entered by an observer thereof, said insertion means providing a response signal in accordance with the entered solution; and
comparator means for comparing said computed signal and said response signal and operative to provide a comparison signal.

2. A teaching device as recited in claim 1 wherein said comparison signal is utilized to trigger said random signal generator means to generate new random output signals.

3. A teaching device as recited in claim 2 which further includes a timer means to disable said teaching device after a predetermined period of time has elapsed following the application of said control signal.

4. A teaching device as recited in claim 3 which further includes counter means for indicating the number of comparison signals provided during said predetermined period of time.

5. A teaching device as recited in claim 1 including a relationship generator means for generating a relationship signal, said display means being responsive to said relationship signal and operative to display indicia commensurate therewith and said signal computer means also being responsive to said relationship signal and operative to provide a computed signal in accordance with the relationship between said relationship signal and said output signals.

6. A teaching device as recited in claim 5 wherein said relationship generator means is a generator of random relationship signals.

7. A teaching device as recited in claim 6 wherein the output of said comparator means is utilized to trigger said random signal generator means to generate new random output signals and said relationship generator means to generate a new random relationship signal.

8. A teaching device as recited in claim 7 further including a timer means to disable said teaching device after a predetermined period of time has elapsed following the application of said control signal.

9. A teaching device as recited in claim 8 further including a counting means for indicating the number of responses completed during said predetermined period of times.

10. A teaching device as recited in claim 2 wherein said output signal indicia are in the form of numerical digits and said relationship indicia is in the form of an arithmetic operator symbol and wherein said signal computer means operates in accordance with an arithmetic operator selected from the group consisting of addition, subtraction, multiplication and division.

11. Apparatus as recited in claim 10 further including a random relationship generator means for supplying an arithmetic relationship signal to said display means commensurate with a further arithmetic relationship and to said signal computer means to provide a computed signal in accordance with further arithmetic relationship.

12. A teaching device as recited in claim 5 wherein said indicia are in the form of numerical digits and arithmetic operator symbols and wherein said signal computer means is in arithmetic computing device operating in accordance with an arithmetic operator selected from the group consisting of one or more of addition, subtraction, multiplication and division.

13. A teaching device comprising:
random signal generating means for generating a plurality of independent random signals;
indicator means responsive to said random signals and operative to display indicia commensurate therewith;

computing means responsive to said random signals and operative to provide a computed signal commensurate with a selected interrelationship between said random signals;

response insertion means into which a mentally computed input can be entered by an observer in response to an inspection of said indicator means, said insertion means producing a response signal; and comparator means responsive to said computed signal and said response signal and operative to provide a predetermined indication upon coincidence therebetween.

14. A teaching device as recited in claim 13 wherein said indicia include digital characters commensurate with said random signals and an arithmetic operator commensurate with said selected interrelationship disposed between said digital characters.

15. A teaching device as recited in claim 12 wherein said random signal generating means generates a new plurality of random signals in response to the occurrence of said predetermined indication.

16. A teaching device comprising:

a random signal generating means for generating random outputs;

display means operatively coupled to said generating means and displaying indicia responsive to said random outputs;

response insertion means into which an observer may insert his responses to the indicia displayed by said display means; and comparator means for comparing said random outputs with said responses and for producing an indication of correspondence therebetween.

17. A teaching device as recited in claim 16 wherein said comparator means includes an analyzer means for analyzing said random outputs and producing resultant indications which can be directly compared with said responses.

References Cited

UNITED STATES PATENTS

| | | | |
|---|---|---|---|
| 925,716 | 6/1909 | McAnulty | 35—6 |
| 3,439,281 | 4/1969 | McGuire et al. | 273—138(A)X |

WILLIAM H. GRIEB, Primary Examiner

U.S. Cl. X.R.

35—6, 9; 273—138; 328—59